Figure 1:
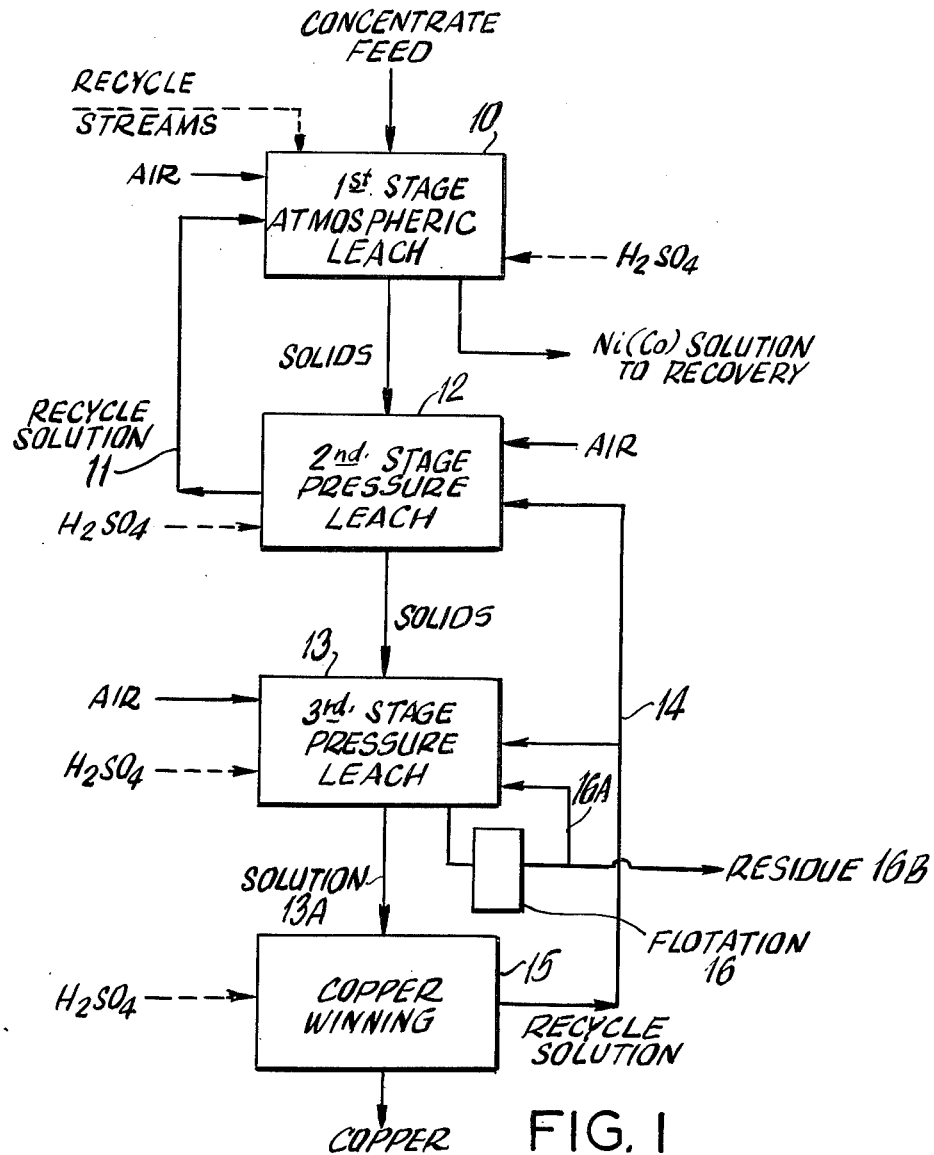

United States Patent [19]

Hoover

[11] 4,130,626

[45] Dec. 19, 1978

[54] FLOTATION SEPARATION OF IRON OXIDE FROM UNDIGESTED MATTE PARTICLES OBTAINED FROM AUTOCLAVE LEACH RESIDUES

[75] Inventor: Raul M. Hoover, Arvada, Colo.

[73] Assignee: Amax Inc., Greenwich, Conn.

[21] Appl. No.: 847,256

[22] Filed: Oct. 31, 1977

[51] Int. Cl.² .................... C01G 3/10; C01G 53/10
[52] U.S. Cl. ...................................... 423/26; 423/41; 423/150; 209/165
[58] Field of Search ............... 423/26, 41, 150; 75/2, 75/117, 119; 209/165, 164

[56] References Cited

U.S. PATENT DOCUMENTS

| | | | |
|---|---|---|---|
| 938,732 | 11/1909 | Wentworth | 209/165 |
| 1,020,353 | 3/1912 | Horwood | 209/165 |
| 1,140,865 | 5/1915 | Bacon | 75/2 |
| 1,377,738 | 5/1921 | Thane | 209/164 |
| 2,569,680 | 10/1951 | Leek | 209/166 |
| 4,024,218 | 5/1977 | McKay et al. | 423/26 |

*Primary Examiner*—Brian Hearn
*Attorney, Agent, or Firm*—Michael A. Ciomek; Eugene J. Kalil

[57] ABSTRACT

Undigested matte particles in autoclave leach residues containing iron oxide are separated from iron oxide by subjecting an aqueous slurry thereof to flotation without the use of a flotation reagent by bubbling air therethrough to form a froth containing said undigested matte particles which is recycled for further leaching and provide an iron oxide-containing tails which is removed and discarded.

11 Claims, 2 Drawing Figures

FLOTATION SEPARATION OF IRON OXIDE FROM UNDIGESTED MATTE PARTICLES OBTAINED FROM AUTOCLAVE LEACH RESIDUES

This invention relates to the flotation separation of undigested matte particles from iron oxide obtained in the high pressure leaching of matte containing at least one of the metal values nickel and copper.

STATE OF THE ART

It is known to pressure leach nickel-copper matte in one or more autoclaves to effect dissolution of metal values therefrom (for example, Ni, Co, Cu, among others). Generally, such mattes contain iron as an impurity, the amount of iron ranging anywhere from about 0.5% to as high as 20% by weight of the matte.

Following pressure leaching in an autoclave, the iron reports as an iron oxide precipitate in the undigested matte residue which also contains recoverable metal values. These metal values can be recovered by recycling the matte residue back into the autoclave leach circuit to joint the feed entering the autoclave circuit.

However, a disadvantage of this method is that a relatively large amount of iron oxide is recycled to the autoclave which decreases the useful autoclave volume, the energy efficiency and the filtering capacity, among other disadvantages. Generally, the amount of iron oxide increases in the leached residue as the residue moves from one leaching stage to the other to effect further dissolution of the metal values therein.

The foregoing problem arises in leaching processes in which the matte is acid pressure leached (e.g., as described in U.S. Pat. No. 2,588,265) or in processes in which the matte is subjected to a multi-stage acid leach involving a series arrangement of two or more leaching stages in which the matte residue of one stage is further leached in a second or third stage to provide a pregnant liquor and undigested matte residue containing iron oxide. One example of a multi-stage leach circuit is the combination of an atmospheric leach stage (that is, a leaching stage conducted at ordinary pressure) with at least one high pressure, high temperature oxidation leach stage. Multi-stage acid leach processes are disclosed in U.S. Pat. Nos. 3,293,027, 3,741,752 and 3,962,051.

It is generally the matte residue from the last stage pressure leach which is recycled back into the process and which presents the problem of iron oxide contamination and hence the problem of its removal. In copending application Ser. No. 831,364 (filed Sept. 8, 1977), now U.S. Pat. No. 4,093,526, a multi-stage leaching process is disclosed to which the present invention is particularly applicable in treating the final matte residue.

In separating the undigested matte residue from the pregnant liquor by liquid-solid separation methods, such as in a thickener, it is generally preferred to add a flocculating agent, usually a long chain organic compound, such as a polyacrylamide, to flocculate the fine particles of the undigested residue and to effect efficient and rapid liquid-solid separation.

Generally, a small but effective amount of the long chain acrylamide compound is added to the slurry discharged from the autoclave while mixing the slurry to effect flocculation of the fine particles of residue and hence the rapid separation of the residue from the pregnant liquor. Examples of polyacrylamides which are suitable for this purpose include those sold under the trademarks SEPARAN MG 200, SUPERFLOC 16, SUPERFLOC 20, and the like. A preferred flocculant is a non-ionic or weakly anionic polyacrylamide of the following formula:

$$(CH_2 = CHCONH_2)_x$$

where $x$ denotes the number of mer units making up the polymer, a high molecular polymer flocculant being particularly preferred. The floc is an intimate mixture of both the undigested matte particles and the iron oxide residue formed during the high pressure leach.

It would be desirable to separate the undigested matte particles from the iron oxide for recycle back into the leaching process.

It has been found that the iron oxide particles, whether intimately bound as a floc with the undigested matte particles or dispersed through a slurry of the matte residue can be easily separated from the undigested matte particles by a flotation treatment without using a flotation reagent. Flotation has been suggested for recovering unreacted sulfides for recycle into the pressure leaching system. In this connection, reference is made to the publication *Extractive Metallurgy of Copper*, Vol. II(1976), published by AIME (pps. 654 to 669). On page 664, a flotation step is disclosed using potassium amyl xanthate as the collector and SA 1263 as a frothing agent. In this method, the unreacted sulfide slurry is filtered and washed before adding the reagents to the slurry prior to flotation. Washing is important to remove dissolved copper and nickel, otherwise the xanthate will combine with copper and nickel ions to form a xanthate precipitate which is not desirable. Complete washing of the unreacted sulfides is not necessary in applicant's process since no flotation agents are required in the flotation process.

OBJECTS OF THE INVENTION

It is an object of the invention to provide a method for separating undigested particles of matte from particles of iron oxide in the high pressure leaching of matte containing at least one of the metal values nickel and copper.

Another object is to provide a method of leaching matte containing at least one of the metal values nickel and copper, wherein undigested matte particles following high pressure leaching are separated from iron oxide formed during leaching and recycled back into the leaching process.

Figure 2:
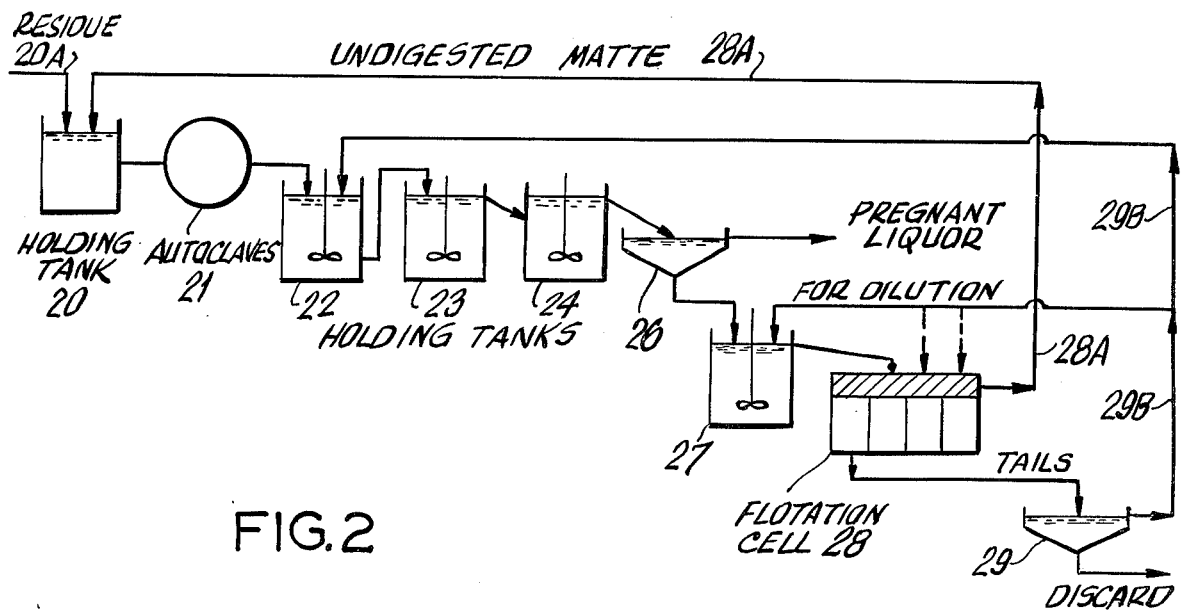

These and other objects will more clearly appear from the disclosure and the accompanying drawing, wherein:

FIG. 1 is illustrative of one embodiment of a multi-stage leaching process to which the invention is applicable; and FIG. 2 is a flow sheet of one embodiment for carrying out the invention.

STATEMENT OF THE INVENTION

A novel feature of the invention resides in the fact that undigested matte obtained in the pressure leaching of nickel-copper matte can be recovered for recycling into the leaching process by employing a "natural flotation" process, that is, without the use of a flotation reagent, to separate the undigested matte particles from iron oxide present in the partially digested residue.

One embodiment of the invention resides in a method of leaching matte containing at least one of the metal values nickel, cobalt and copper and containing iron as an impurity, wherein during the hydrometallurgical treatment of the matte, it is subjected to at least one high pressure, high temperature oxidation leach in an autoclave to dissolve substantial amounts of said metal values and provide a pregnant liquor thereof and an undigested matte residue containing iron oxide. The residue comprising undigested matte particles and iron oxide is separated from the pregnant solution (liquid/solid separation in a thickener) and the residue in the form of an aqueous slurry is subjected to flotation in a flotation cell without the use of a flotation reagent by bubbling air therethrough. The bubbling is continued for a time sufficient to float the undigested matte particles and form a froth thereof and an iron oxide tailings. The froth is collected for recycling into the leaching process and the tailings discarded.

The foregoing flotation separation step can be classified as a "natural flotation" process in that only air is required and no other reagent is needed. In fact, the most commonly used frothers, such as pine oil and the frother sold under the trademark "Dowfroth 250" have been found to depress the floatability of sulfides. In this connection, the results obtained with the invention are quite unexpected, particularly since the residue need not be washed prior to flotation.

It has been observed that most of the precious metals report in the flotation concentrate with recoveries between 70% to 80%, with the exception of the metals osmium and iridium. Apparently, this results in a build-up of precious metals in the recycle stream (the flotation concentrate) which raises the possibility of precious metal recovery from the bleed stream.

The high flotability of the undigested matte particles is believed to be due to either a clean (unoxidized) hydrophobic sulfide surface, or to the presence of an elemental sulfur film. The stable froth produced is believed to be attributed to the fact that solid particles forming a finite contact angle with an air bubble serve as a foam or froth stabilizer.

Where the undigested matte is thickened using a flocculating agent, such as a long chain polyacrylamide compound, it is necessary to break up the floc before subjecting the thickened residue or pulp to flotation. This is achieved by subjecting the thickened residue to high speed, high shear stirring sufficient to break up the flocculated residue.

The high speed stirring using a shafted propeller or a serrated disc-type impeller is preferably one that provides a peripheral speed of at least about 3000 feet per minute. The serrated disc-type of impeller is particularly preferred as this type of impeller geometry minimizes power requirements, while at the same time maximizes shear conditions.

A mineralogical analysis of the flotation concentrate revealed that it consisted essentially of copper and nickel sulfides, with the tails consisting mainly of fine grain iron oxide (hematite). However, a small amount of the copper and nickel sulfide tends to report with the iron oxide tailings.

In a first set of preliminary flotation tests using a 4-liter capacity Denver Model D-2 laboratory flotation cell (manufactured by the Denver Equipment Company of Denver, Colo.) using an undigested matte residue containing iron oxide obtained in a multi-stage leaching program, it was observed that the flotation selectivity was inadequate. This result was traced to the use of a long chain polymer flocculating agent (polyacrylamide) in the thickener.

It was thought that this could be overcome by subjecting the slurry, prior to flotation, to high speed agitation under "high shear" conditions in order to destroy the polymer chains and disperse the particles to a point sufficient to promote a higher flotation selectivity. A series of tests indicated that an impeller rotating at 3000 rpm using, for example, a 2-inch diameter propeller-type impeller (about 1500 peripheral feet per minute) required a retention time of about 15 minutes to break up the flocculated residue. However, it is preferred that the stirring rate be at least about 3000 peripheral feet per minute in order to minimize the retention time. The desired stirring rate at low retention time can be easily determined by experiment. The stirring rate may range from about 3000 to 6000 peripheral feet per minute, depending upon equipment size and configuration.

It is known to employ high shear agitation in such processes as emulsification, dispersion, homogenization, and the like. A paper on this subject appears on pages 338 to 342 in the A.I. Ch.E Journal of May, 1963 entitled "Agitation of Liquid Systems Requiring High Shear Characteristics" authored by P. L. Fondy and R. L. Bates.

Reference is also made to a paper entitled "Shear Degradation of Polyacrylamide Solutions" by J. M. Maerker submitted as Paper No. SPE 5101 at the 49th Annual Fall Meeting of the Society of Petroleum Engineers of AIME at Houston, Texas, Oct. 6 to 9, 1974.

The method of the invention was found to have particular utility in a multi-stage acid leaching process of the type shown in FIG. 1.

One embodiment of a multi-stage leaching process is given in FIG. 1. Concentrate feed or matte containing nickel and copper sulfide and iron as an impurity is fed in the comminuted state to the first stage atmospheric leach 10. The sulfide composition generally comprises about 30% to 70% Ni, small amounts of cobalt, about 5% to 25% Cu, about 5% to 25% S, about 0.5% to 20% Fe and the balance impurities, residuals, etc., the total Ni, Cu, Fe and S content being generally over 85% and at least about 90% by weight. The amount of sulfur present is usually less than that required to combine stoichiometrically with the metal values present. The composition generally contains by weight at least about 20% and preferably at least about 30% metallic nickel in acid soluble form.

The matte fed to the first stage (minus 150 mesh screen [U.S. Standard] with at least 50% passing through a 325 mesh screen) is formed into a slurry generally having a pulp density ranging from about 5 to 25% solids by weight in a copper-containing sulfuric acid solution (obtained generally by recycle from the second stage pressure leach 12) having an initial pH ranging up to about 3.5 and the slurry subjected to a first stage atmospheric leaching and refining step at atmospheric pressure and a temperature ranging from about 40° C. to 95° C., preferably from about 60° C. to 85° C., while aerating said slurry. The time is sufficient to effect dissolution of substantial amounts of nickel during which copper is cemented out and nickel sulfate formed, the leaching being continued to a terminal pH of over about 5 to refine and purify said solution by further rejecting copper and impurities (e.g. iron) by hydrolysis therefrom and provide a first stage residue containing undissolved nickel and copper, together with iron and other impurities.

The purified nickel-containing solution is separated from the residue for nickel recovery by liquid/solid separation, for example, in a thickener and the residue subjected in the form of an aqueous slurry to a second stage leaching step at 12 at elevated temperature and pressure in a sulfuric acid-containing solution at a pH below 3.5 under oxidizing conditions for a time sufficient to reach a terminal pH ranging from about 2.5 to 4 and preferably from about 2.8 to 3.3 to effect additional dissolution of nickel and some copper and provide a pregnant solution thereof which is recycled to the atmospheric leach and a second stage residue impoverished in nickel. The copper sulfate formed by dissolution from the cement copper aids further in the leaching of the nickel in the residue. The leach solution in the second stage leach is generally recycle spent solution from the copper winning circuit 15. The conditions in the second stage leach are preferably controlled so that the total molar ratio of free $H_2SO_4$ plus $CuSO_4$ in the spent copper sulfuric acid solution to the unleached nickel in the atmospheric leach residue ranges from about 0.7 to 1.3 and, preferably, from about 0.7 to 0.95.

As stated above, the second stage pregnant solution containing both nickel and copper is separated from the second residue (for example, in a thickener), and recycled to the first stage atmospheric leach for removal of copper and impurities therefrom and provide a refined and purified nickel solution from which a substantially pure nickel product is subsequently recovered.

The thickened second stage residue is subjected to a third stage leaching step under oxidizing conditions at elevated temperature and pressure at 13 in a sulfuric acid-containing solution with the molar ratio of total sulfur to total non-ferrous metals in the slurry ranging from about 0.9:1 to 1.3:1 and generally from about 1:1 to 1.1:1 to effect dissolution of substantially all of the nickel, cobalt and copper present and form a third stage residue and a third stage pregnant solution having a terminal pH ranging up to about 3 and, preferably, from about 1.5 to 2.5. The third stage pregnant solution is separated from the residue and subjected to the selective removal of copper at 15, preferably by electrowinning. The spent copper-sulfuric acid is usually recycled back into the system, for example, to one or more of the various leaching stages.

The third stage undigested matte residue is usually recycled to the third stage autoclave for further treatment. It is at this stage that the presence of iron oxide presents a problem.

As illustrative of the invention, the following example is given as applied to the multi-stage leaching process of FIG. 1.

EXAMPLE 1

A nickel-copper matte was leached having the following composition:
Ni: 44.5%
Cu: 29.0%
Co: 0.8%
Fe: 1.8%
S: 20.7%

Oxygen and impurities, the balance about 3 to 4%.

The matte was comminuted to pass through 150 mesh screen with at least about 50% passing through 325 mesh screen (U.S. Standard). As will be noted, the matte contained 1.8% Fe as an impurity.

Referring to FIG. 1, the atmospheric leach slurry was prepared to provide a pulp density of about 13% solids in atmospheric leach step 10 by mixing 10 kg of the concentrate with 10 liters $H_2O$ and 48.5 liters recycle solution 11 from the second stage pressure leach 12, the second stage pressure leach solution having the following approximate composition: 60 gpl Ni, 33 gpl Cu, 0.45 gpl Fe, 0.5–1 gpl $H_2SO_4$ (pH about 3), the solution containing the following impurities: Si and Ca $\lesssim$ 0.2 gpl each; Al, As, Sb and Bi $\lesssim$ 0.05 gpl each; Cr, Cd, Sn and Se $\lesssim$ 0.01 gpl each.

The atmospheric leach slurry was maintained in the temperature range of about 75° C. to 85° C. for 3.5 hours while continuously flowing air into the atmospheric leach tank at about 3.0 SCFM. The leaching was continued to a terminal pH between about 5 to 6 and terminated preferably at a pH of about 5.4 to 5.5.

The nickel was partially solubilized until about 35% of the total nickel in the concentrate was dissolved and substantially all of the copper from the second stage pressure stage solution was cemented and/or hydrolyzed out to provide a highly enriched, purified nickel leach solution having the following approximate composition: 75 gpl Ni; 1.3 gpl Co, 0.05–0.1 gpl Ca; $\lesssim$ 0.02 gpl Si; $\lesssim$ 0.01 gpl Cu and Bi each; $\lesssim$ 0.005 gpl each of Fe, Al, Cd, Sb, As, Sn, Se and Pb.

The leached solids or residue (10.4 kg) produced in the first stage atmospheric leach was washed with water and reslurried in 10 liters of water and 42 liters of the spent copper-sulfuric acid solution from the copper winning circuit 15 before the residue passed to the second stage pressure leach 12.

The first stage residue and the spent copper-sulfuric acid solution had the following compositions:

Table 2

| Atm. Leached Residue, % | Spent Electrolyte, gpl |
|---|---|
| Ni – 27.90 | Ni – 35 |
| Cu – 43.80 | Cu – 29 |
| S – 20.75 | $H_2SO_4$ – 63 |
| Fe – 2.0 | |
| $O_2$ and others – about 5 | |

The second stage pressure leach which provides additional nickel solubilization as well as moderate copper extraction (to supply cupric ions for the atmospheric leach) was carried out under the following conditions:

Table 3

| Temperature | 150° C – 160° C |
|---|---|
| Oxygen Pressure | 1.7 – 2.4 atm gage |
| Acidity, pH Terminal | 3 |
| Oxygen Supply | Sufficient oxygen to oxidize metallics to oxides, ferrous ions to the ferric state and up to 10% of the sulfide sulfur to sulfates |
| Time | 30 minutes |

The amount of the spent copper-sulfuric acid solution recycled to the second stage pressure leach was proportioned so that the molar ratio of $H_2SO_4$ + $CuSO_4$ in the spent solution to the unleached nickel in the atmospheric leach residue ranged from about 0.90 to 0.95.

The pregnant solution obtained in the second stage pressure leach was used as the recycle leach solution in the atmospheric leach, the composition being given below: 60 gpl Ni, 33 gpl Cu; 0.45 gpl Fe, 0.5–1 gpl H₂SO₄ (pH 3). However, the pH may range from about 2.7 to 3.5.

The second stage leach residue following second stage leaching had the following composition by weight:

| Residue weight | 8.9 kg |
|---|---|
| Ni | 17.0% |
| Cu | 46.8% |
| Fe | 2.7% |
| S | 22.1% |
| O₂ and impurities | about 11 to 12% |

Based on the amount of feed in the second stage pressure leach and residue remaining therein and the analysis thereof, about 48% and 9%, respectively, of nickel and copper extractions were achieved in the second stage pressure leach.

The amount of nickel extracted from the first stage residue in the second stage leach based on the total nickel in the original concentrate was about 31% by weight.

The second stage residue was then passed to the third stage pressue leach 13 in which the residue was subjected to total leaching under the following conditions:

Table 4

| Temperature | 190° C to 200° C |
|---|---|
| Oxygen Pressure | 4.8 to 5.5 atm gage |
| Oxygen Supply | To oxidize sulfide sulfur to sulfates |
| pH (Terminal) | 2 to 2.2 (the pH may range from about 1.2 to 2 |
| Time | 60 minutes |

Prior to third stage pressure leaching, the second stage pressure leach residue was slurried with 42 liters of fresh water and 31 liters of the spent copper-sulfuric acid (Ni — 35 gpl, Cu — 29 gpl, H₂SO₄— 63 gpl). Also, 1.0 kg H₂SO₄ was added to make up the total sulfur/total Ni plus Cu molar ratio in this stage to about 1:1 (cobalt included). Water was added mainly to keep metal concentration in the final leach solution below a saturation level.

The foregoing provided a leach solution 13A which was passed on to the copper winning circuit 15, the solution having the following composition: Ni — 35 gpl, Cu — 68 gpl, Fe about 2.5 gpl and H₂SO₄ about 2 gpl.

About 1 kg of undigested matte residue is obtained assaying about 2.4% Ni, 6.32% Cu, 5.64% Fe as iron oxide. The undigested residue is accumulated and thickened in a thickener. To enhance the rate of settling, a polyacrylamide flocculating agent sold under the trademark SEPARAN MG 200 is added. The settled undigested residue is separated from the liquid. As stated hereinbefore, it need not be washed. It is formed into an aqueous slurry and the slurry thereafter subjected to high speed, high shear stirring to break up the flocculated residue and the slurry in the form of a dispersion passed on to flotation cell circuit 16 into which air is bubbled to form a froth of the undigested matte particles with the iron oxide depressed. The separated undigested matte particles are recycled via 16A to third stage leach 13 for further treatment in the autoclave under elevated temperature and pressure, the iron oxide being discarded as residue 16B.

The flotation circuit is shown in more detail in FIG. 2 in which matte residue 20A from the previous leaching stage (e.g. second stage leach 12) is fed to holding tank 20 which also receives undigested matte residue recycled from flotation cell 28, the matte residue and the recycled undigested matte being fed as a slurry to one or more third stage autoclaves (third stage pressure leach 13 of FIG. 1) for final digestion.

Following final leaching at 21, the solid-liquid product or slurry discharged from autoclave 21 is fed to holding tanks 22, 23, 24 and from there to primary thickener 26. A long chain polyacrylamide flocculant or other suitable flocculant is added to the slurry in the primary thickener to provide a floc having rapid settling properties, the pregnant liquor being thereafter drawn off the primary thickener as shown and fed to the copper winning circuit 15 shown in FIG. 1.

The thickened undigested matte is fed to high shear mixing tank 27 where the floc is broken up and the undigested matte particles dispersed and fed to flotation cell 28. Overflow solution (29B) from secondary thickener 29 is recycled to the cell to dilute the slurry fed thereto. Air is bubbled through the slurry in the flotation cell to provide a froth containing fine particles of undigested matte, the recovered undigested matte particles being then recycled via 28A to holding tank 20.

The iron oxide which reports in the tails is fed as shown to secondary thickener 29 where it is flocculated by the addition of a flocculant to aid in the rapid settling thereof, the iron oxide tails being thereafter discarded. Overflow liquor 29B is recycled to various parts of the process where make-up solution is needed.

The preferred flocculant employed is the previously mentioned non-ionic or weakly anionic polyacrylamide having the following formula:

$(CH_2 = CHCONH_2)_x$ where "x" is the number of mer units ranging from about 14 to approximately 20,000, the molecular weight of the flocculant ranging from about $10^3$ to about $15 \times 10^6$. A desired polyacrylamide flocculant is sold under the trademark SEPARAN MG 200 which has an average molecular weight of about $10^6$ and approximately 10,000 mer units.

Flotation tests were conducted on various samples of undigested third stage leach matte residues in the 4-liter capacity Denver Model D-2 laboratory flotation cell after the flocculated residue was broken up and dispersed by high shear stirring. About 75% of the total iron in the matte residue was separated as tails by flotation. A typical test is given as follows:

EXAMPLE 2

An aqueous slurry was produced from a thickened sample having a dry weight of 562.8 grams. The slurry had a temperature of 180° F., a pH of about 2.5 and a pulp density of about 22.8% solids. As stated earlier, the thickened sample is not washed before forming the aqueous slurry thereof. The airflow rate in the flotation cell was about 3 liters per minute and the flotation carried out for about 15 minutes. The head analysis of the sample was as follows:

| Dry Weight | % Ni | % Cu | % Fe | % Co | % S |
|---|---|---|---|---|---|
| 562.8 grs. | 8.6 | 23.08 | 21.42 | 0.27 | 18.6 |

As will be noted, the amount of iron accumulated in the third stage leach residue is rather high (21.42%). Recycling the residue with no other treatment will produce an iron build-up in the recycle circuit. Thus, substantial removal of iron prior to recycling the residue is important so as to avoid iron build-up.

After completion of the flotation (15 minutes), the concentrate recovered for recycling had the following analysis:

| Dry Weight | % Ni | % Cu | % Fe | % Co | % S |
|---|---|---|---|---|---|
| 311.3 grs. | 12.9 | 35.4 | 9.8 | 0.35 | 27.3 |

The tails had the following analysis:

| Dry Weight | % Ni | % Cu | % Fe | % Co | % S |
|---|---|---|---|---|---|
| 251.5 grs. | 3.28 | 7.84 | 35.8 | 0.18 | 7.9 |

The percent distribution of the elements in the concentrate calculated to 92.9% Ni, 84.8% Cu, 25.3% Fe, 70.3% Co and 81% S. Thus, about 75% of the iron was removed from the undigested matte residue before recycle.

Additional tests showed that up to 90% Ni, up to about 94% Cu and up to about 75% Co could be recovered in the flotation concentrate.

Analyses of various flotation concentrates also indicated that most of the precious metals are recovered in the concentrate (with the exception of osmium and iridium). Thus, a build-up of precious metals will occur in the recycle circuit from which a bleed stream can be obtained in order to recover the precious metals therefrom.

It is not clearly understood why the undigested matte particles float so easily and with relatively high efficiency since the particles are generally less than about 10 microns in size. It is known, however, that a clean sulfide surface (that is, a non-oxidized surface) is hydrophobic. It is therefore assumed that under the conditions predominating inside the autoclave (pressure, temperature, pH, etc.), the particles will have a naturally hydrophobic clean surface which will attach strongly to air bubbles and stabilize the froth. As stated herein, the other possibility is the creation of a sulfur film in the surface of the matte particles during the leaching operation which is known to render the surfaces of the particles highly hydrophobic and thus promote in this manner adhesion to the bubbles.

It is known that, in a regular flotation system, selectivity decreases with a decrease in particle size, generally below 20 microns, and selective flotation is rarely applied industrially to particulates below 10 microns. However, as particle size decreases, the retention time required to achieve selective flotation increases. The present invention is applicable to particle sizes less than 325 mesh (U.S. Standard), e.g. less than 44 microns or 30 microns and even less than 20 or 10 microns.

Also, as stated earlier, pressure leaching in an autoclave provides an iron oxide precipitate or residue (hematite) having granular or crystalline properties which is easier to separate than gelatinous iron hydroxide precipitates.

Typical pressure leaching parameters employed in the high pressure high temperature oxidation acid leaching of nickel and/or copper matte containing iron as an impurity are as follows:

| Temperature | in excess of 100° C and ranging as high as 250° C, e.g. 150° C to 215° C |
|---|---|
| Oxygen Pressure | 0.7 atm. to 20 atm. gage |
| Total Pressure | 7 to 50 atm. gage |
| Terminal pH | ranging up to about 4 usually from 2 to 3 |

As will be apparent from Example 2, the iron oxide tailings contain both nickel and copper. A study of a typical tailings produced in accordance with the invention using X-ray diffraction, the microscope and the electron microprobe revealed that the small amount of copper and nickel sulfide particles present were found invariably to have a coating (film) of iron oxide, thus explaining why they resisted flotation. Even then, about 70% to 95% of the total metal values was recovered in the flotation concentrate. Copper and nickel are also present in the iron oxide phase in low concentration, very probably in solid solution. The concentrate consisted essentially of copper and nickel sulfides (undigested matte particles).

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method of leaching comminuted matte containing at least one of the metal values nickel and copper and containing iron as an impurity, wherein said matte in the form of a slurry is subjected to at least one high pressure high temperature oxidation leach in an autoclave to dissolve substantial amounts of said metal values and provide a pregnant liquor thereof and a residue comprising undigested matte and iron oxide in flotation separable form, and wherein said slurry is subjected to liquid/solid separation to effect separation of said pregnant liquor from said residue containing said iron oxide and said undigested matte, the improvement comprising, subjecting an aqueous slurry of said autoclave leach residue to flotation in a flotation cell without the addition of a flotation reagent by bubbling air therethrough, continuing bubbling air through said aqueous slurry to float selectively undigested matte particles and form a froth containing said undigested matte particles and a tailings containing substantially this iron oxide, collecting said froth, and disposing of said iron oxide-containing tailings.

2. The method of claim 1, wherein the undigested matte particles recovered by said froth are recycled to said autoclave for further leaching thereof.

3. In a method of leaching comminuted matte containing at least one of the metal values nickel and copper and containing iron as an impurity, wherein said matte in the form of a slurry is subjected to at least one high pressure high temperature oxidation leach in an autoclave to dissolve substantial amounts of said metal values and provide a pregnant liquor thereof and a residue comprising undigested matte and iron oxide in flotation separable form, and wherein said slurry is subjected to liquid/solid separation to effect separation of said pregnant liquor from said residue containing said iron oxide and said undigested matte by adding a flocculating agent to flocculate said residue and effect the settling thereof, the improvement which comprises, subjecting an aqueous slurry of said settled flocculated autoclave leach residue to high speed, high shear stirring sufficient to break up said flocculated residue and form a dispersion of undigested matte particles and iron oxide in said slurry,
   subjecting said slurry to flotation in a flotation cell without the addition of a flotation agent by bubbling air therethrough,
   continuing bubbling air through said aqueous slurry to float selectively said undigested matte particles and form a froth containing said particles and a tailings containing said iron oxide,
   collecting said froth of undigested matte particles and recycling it back into the leaching process,
   and disposing of said iron oxide-containing tailings.

4. The method of claim 3, wherein said stirring is carried out with an impeller rotatng at a peripheral speed of at least about 3000 feet per minute.

5. In the acid leaching of comminuted copper nickel matte containing about 30% to 70% nickel, about 5% to 40% copper, 0.5% to 20% iron, about 5% to 25% sulfur, the sum of the nickel, copper, iron and sulfur contents being at least about 85% be weight of said matte, wherein said comminuted matte is atmospherically leached with a sulfuric acid-containing solution to effect selective dissolution of a substantial amount of nickel in said matte and provide an atmospheric leach matte residue which in the form of a slurry is thereafter subjected to at least one high pressure high temperature oxidation leach in an autoclave to dissolve substantial amounts of nickel and copper from said atmospheric leach residue and provide a pregnant liquor thereof and a residue comprising undigested matte and iron oxide in flotation separable form, and wherein said slurry is subjected to liquid/solid separation to effect separation of said pregnant liquor from said residue containing said iron oxide and said undigested matte, the improvement comprising, subjecting an aqueous slurry of said autoclave leach residue to flotation in a flotation cell without the addition of a flotation agent by bubbling air therethrough,
   continuing bubbling air through said aqueous medium to float selectively said undigested matte and form a froth containing undigested matte particles and a tailings containing substantially said iron oxide,
   collecting said froth and disposing of said iron oxide-containing tailings.

6. The method of claim 5, wherein the undigested matte particles recovered by said froth are recycled to said autoclave for further leaching thereof.

7. In the leaching of comminuted copper nickel matte containing about 30% to 70% nickel, about 5% to 40 % copper, 0.5% to 20% iron, about 5% to 25% sulfur, the sum of the nickel, copper, iron and sulfur contents being at least about 85% be weight of said matte, wherein said comminuted matte is atmospherically leached with a sulfuric acid-containing solution to effect selective dissolution of a substantial amount of nickel in said matte and provide an atmospheric leach matte residue which in the form of a slurry is thereafter subjected to at least one high pressure high temperature oxidation leach in an autoclave to dissolve substantial amounts of nickel and copper from said atmospheric leach residue and provide a pregnant liquor thereof and a residue comprising undigested matte and iron oxide in flotation separable form, and wherein said slurry is subjected to liquid/solid separation to effect separation of said pregnant liquor from said residue containing said iron oxide and said undigested matte by adding a flocculating agent to flocculate said residue and effect settling thereof, the improvement comprising, subjecting an aqueous slurry of said settled autoclave leach residue to high speed, high shear stirring sufficient to break up said flocculated residue and form a dispersion of undigested matte particles and iron oxide,
   subjecting said slurry dispersion to flotation in a flotation cell without the addition of a flotation agent by bubbling air therethrough, continuing bubbling air through said aqueous medium to float selectively said undigested matte particles and form a froth containing said undigested matte particles and a tailings containing substantially said iron oxide,
   collecting said froth and disposing of said iron oxide-containing tailings.

8. The method of claim 7, wherein the undigested matte particles recovered by said froth are recycled to said autoclave for further leaching thereof.

9. In the leaching of comminuted copper nickel matte containing about 30% to 70% nickel, about 5% to 40% copper, 0.5% to 20% iron, about 5% to 25% sulfur, the sum of the nickel, copper, iron and sulfur contents being at least about 85% by weight of the matte, wherein said comminuted matte is atmospherically leached with a sulfuric acid-containing solution to effect selective dissolution of a substantial amount of nickel in said matte and provide an atmospheric leach matte residue which in the form of a slurry is thereafter subjected to at least one high pressure high temperature oxidation acid leach in an autoclave at a temperature of over 100° C. at an oxygen pressure ranging from about 0.7 to 20 atm., a total pressure of about 7 to 50 atm. and a terminal pH ranging up to about 4 to dissolve substantial amounts of nickel and copper from said atmospheric leach residue and provide a pregnant liquor thereof and a residue comprising undigested matte and iron oxide in flotation separable form, and wherein said slurry is subjected to liquid/solid separation to effect separation of said pregnant liquor from said residue, the improvement comprising, subjecting an aqueous slurry of said autoclave leach residue to flotation in a flotation cell without the addition of a flotation agent by bubbling air therethrough,
   continuing bubbling air through said aqueous medium to float selectively undigested matte particles and form a froth containing said undigested matte particles and a tailings containing substantially said iron oxide,
   collecting said froth and disposing of said iron oxide-containing tailings.

10. The method of claim 9, wherein the pregnant liquor is separated from said autoclave leach residue by adding a flocculating agent to flocculate said residue and effect settling thereof, and wherein prior to flotation an aqueous slurry of said flocculated residue is subjected to high speed, high shear stirring sufficient to break up said flocculated residue and form a dispersion of undigested matte particles and iron oxide.

11. The method of claim 9, wherein the undigested matte particles recovered by said froth are recycled to said autoclave for further leaching thereof.

* * * * *